US012695588B2

(12) United States Patent
Gao et al.

(10) Patent No.: US 12,695,588 B2
(45) Date of Patent: Jul. 28, 2026

(54) TIME AND FREQUENCY RELATION FOR UPLINK (UL) TRANSMISSION

(71) Applicant: Telefonaktiebolaget LM Ericsson (publ), Stockholm (SE)

(72) Inventors: Shiwei Gao, Nepean (CA); Jianwei Zhang, Solna (SE); Keerthi Kumar Nagalapur, Gothenburg (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 268 days.

(21) Appl. No.: 18/260,361

(22) PCT Filed: Jan. 14, 2022

(86) PCT No.: PCT/IB2022/050309
§ 371 (c)(1),
(2) Date: Jul. 5, 2023

(87) PCT Pub. No.: WO2022/153244
PCT Pub. Date: Jul. 21, 2022

(65) Prior Publication Data
US 2024/0063994 A1     Feb. 22, 2024

Related U.S. Application Data

(60) Provisional application No. 63/138,630, filed on Jan. 18, 2021.

(51) Int. Cl.
H04L 5/14         (2006.01)
H04L 5/00         (2006.01)
H04W 72/23        (2023.01)
(52) U.S. Cl.
CPC .......... H04L 5/1438 (2013.01); H04L 5/0051 (2013.01); H04W 72/23 (2023.01)

(58) Field of Classification Search
CPC . H04L 5/14; H04L 5/00; H04L 25/02; H04W 72/23; H04W 72/54; H04W 72/12;
(Continued)

(56) References Cited

U.S. PATENT DOCUMENTS 11,582,761 B2 * 2/2023 Venugopal ........ H04W 72/1268
11,632,750 B2 * 4/2023 Laddu ....................... H04L 5/00
370/329

(Continued)

FOREIGN PATENT DOCUMENTS

WO          2020029675 A1     2/2020

OTHER PUBLICATIONS

International Search Report and Written Opinion dated May 2, 2022 issued in PCT Application No. PCT/IB2022/050309 filed Jan. 14, 2022, consisting of 13 pages.
(Continued)

*Primary Examiner* — Man U Phan
(74) *Attorney, Agent, or Firm* — Weisberg I.P. Law, P.A.

(57)                    ABSTRACT
A method, system and apparatus are disclosed. According to some embodiments, a network node is provided which is configured to communicate with a wireless device using at least one of a plurality of transmission and reception points, TRPs. The network node includes processing circuitry configured to indicate to the wireless device a first downlink reference signal, DL RS, of a plurality of downlink reference signals, DL RSs, to use for deriving an uplink, UL, transmission parameter for an UL transmission, each of the plurality of DL RSs being associated with a respective one of the plurality of TRPs. The processing circuitry is further configured to receive the UL transmission, the UL transmission being based on the derived UL transmission parameter.

13 Claims, 9 Drawing Sheets

BEGIN

Indicate to the wireless device a first downlink reference signal, DL RS, of a plurality of downlink reference signals, DL RSs, to use for deriving an uplink, UL, transmission parameter for an UL transmission, each of the plurality of DL RSs being associated with a respective one of the plurality of TRPs.
S138

Receive the UL transmission, the UL transmission being based on the derived UL transmission parameter.
S140

END

(58) Field of Classification Search
CPC ..... H04W 72/04; H04W 72/14; H04W 52/08;
H04W 52/24; H04W 52/14; H04W 56/00;
H04W 76/11
USPC ......................................................... 370/329
See application file for complete search history.

(56) References Cited

U.S. PATENT DOCUMENTS

| | | | | |
|---|---|---|---|---|
| 11,864,179 | B2 * | 1/2024 | Kim ...................... | H04B 7/0695 |
| 11,895,673 | B2 * | 2/2024 | Laddu ........................ | H04L 5/00 |
| 2018/0062724 | A1 * | 3/2018 | Onggosanusi ........ | H04L 5/0055 |
| 2019/0174466 | A1 | 6/2019 | Zhang et al. | |
| 2021/0360611 | A1 * | 11/2021 | Manolakos ........... | H04L 5/0023 |
| 2022/0408371 | A1 * | 12/2022 | Matsumura ......... | H04W 52/242 |
| 2023/0189250 | A1 * | 6/2023 | Go ....................... | H04W 52/146 |
| 2023/0309050 | A1 * | 9/2023 | Cha ........................ | H04L 5/0048 |
| 2023/0403108 | A1 * | 12/2023 | Grossmann ........... | H04L 5/0091 |
| 2024/0349277 | A1 * | 10/2024 | Singh ................ | H04W 72/1268 |
| 2025/0150150 | A1 * | 5/2025 | Yuan ........................ | H04L 5/001 |

OTHER PUBLICATIONS

3GPP TS 38.213 V16.4.0 (Dec. 2020) 3rd Generation Partnership Project; Technical Specification Group Radio Access Network; NR; Physical layer procedures for control (Release 16), consisting of 181 pages.

3GPP TSG RAN WG1 #103-e; R1-2007541; Source: FUTUREWEI; Title: Inter-cell Multi-TRP Operation; Agenda Item: 8.1.2.2; Document for: Discussion/Decision; eMeeting, Oct. 26-Nov. 13, 2020, consisting of 8 pages.

Chinese Office Action and English Machine Translation dated Apr. 30, 2026 for Application No. 202311813815.7, consisting of 16 pages.

3GPP TSG RAN WG1 #96b R1-1904394; Title: DL and UL Reference Signals Design for NR Positioning; Source: Samsung; Agenda item: 7.2.10.1; Document for: Discussion and Decision; Location and Date: Xi'an, China, Apr. 8-Apr. 12, 2019; consisting of 15 pages.

* cited by examiner

One slot (14 symbols)

PDCH (data)     Control (PDCCH), possibly data

PDSCH, PDCCH, DL RS #1

PDSCH, PDCCH, DL RS #2

PUCCH/PUSCH/SRS

TRP1

TRP2

WD

Network node(s)

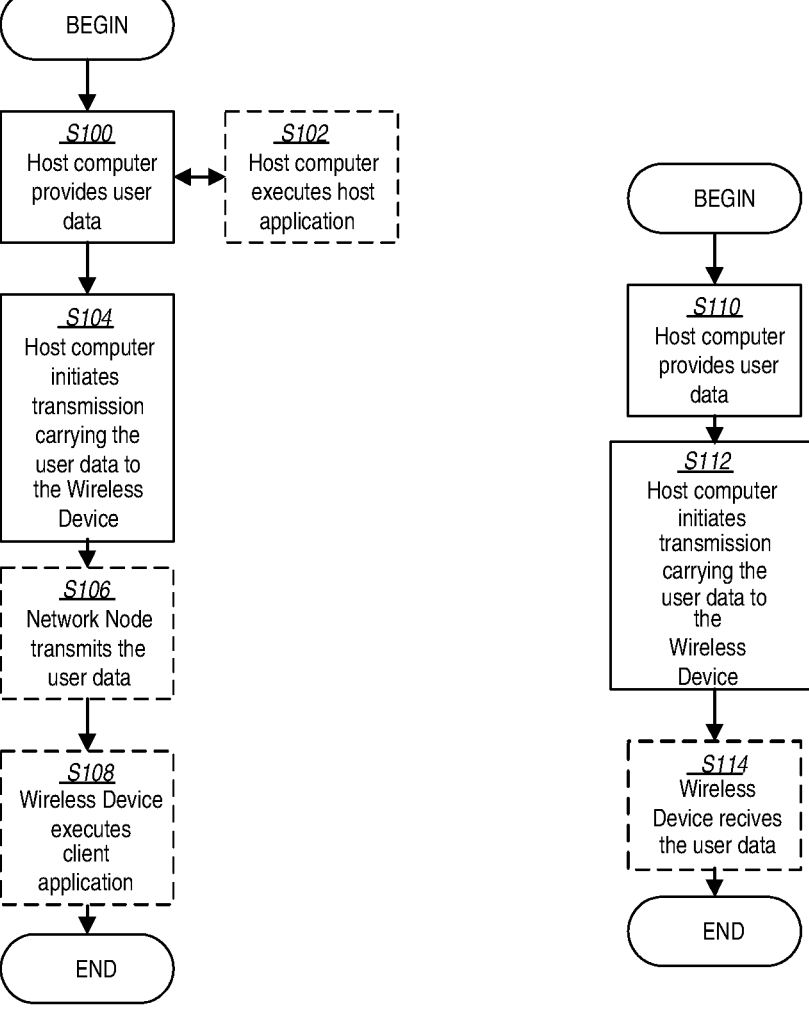
FIG. 6                    FIG. 7

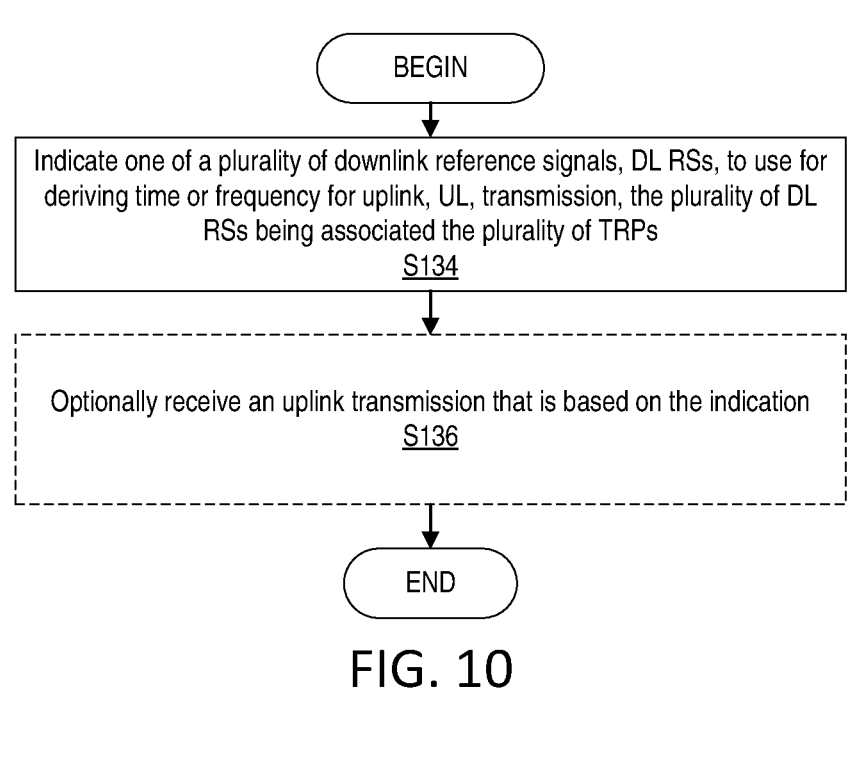

BEGIN

Indicate one of a plurality of downlink reference signals, DL RSs, to use for deriving time or frequency for uplink, UL, transmission, the plurality of DL RSs being associated the plurality of TRPs
S134

Optionally receive an uplink transmission that is based on the indication
S136

END

FIG. 10

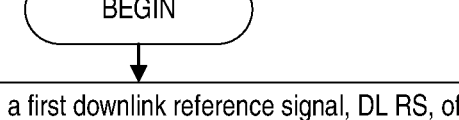

BEGIN

Indicate to the wireless device a first downlink reference signal, DL RS, of a plurality of downlink reference signals, DL RSs, to use for deriving an uplink, UL, transmission parameter for an UL transmission, each of the plurality of DL RSs being associated with a respective one of the plurality of TRPs.
S138

Receive the UL transmission, the UL transmission being based on the derived UL transmission parameter.
S140

END

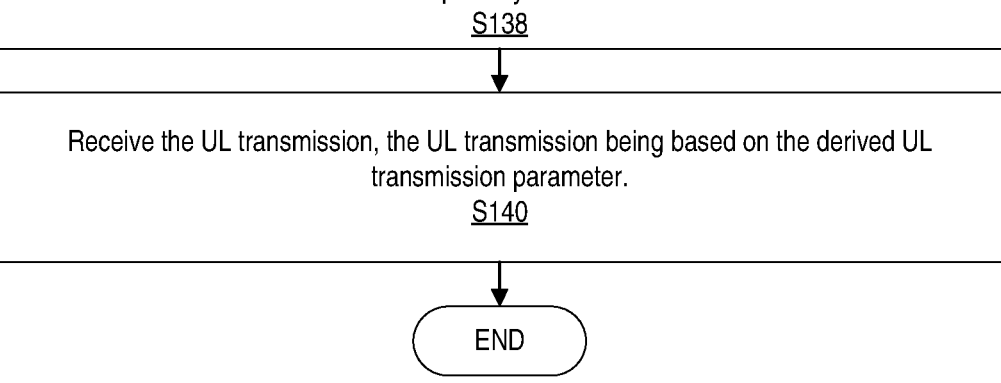

FIG. 11

TIME AND FREQUENCY RELATION FOR UPLINK (UL) TRANSMISSION

CROSS-REFERENCE TO RELATED APPLICATIONS

This application is a Submission Under 35 U.S.C. § 371 for U.S. National Stage Patent Application of International Application No.: PCT/IB2022/050309, filed Jan. 14, 2022 entitled "TIME AND FREQUENCY RELATION FOR UPLINK (UL) TRANSMISSION," which claims priority to U.S. Provisional Application No. 63/138,630, filed Jan. 18, 2021, entitled "TIME AND FREQUENCY RELATION FOR UL TRANSMISSION," the entireties of both of which are incorporated herein by reference.

FIELD

The present disclosure relates to wireless communications, and in particular, to timing and/or frequency derivation for uplink transmission in a network with multiple transmission and reception points (TRPs).

BACKGROUND

The next generation mobile wireless communication system (5th Generation (5G)) or new radio (NR), will support a diverse set of use cases and a diverse set of deployment scenarios. The later includes deployment at both low frequencies (e.g., 100s of MHz), similar to Long Term Evolution (LTE, also referred to as 4th Generation (4G)) today, and very high frequencies (mm waves in the tens of GHz).

Similar to LTE, NR will use OFDM (Orthogonal Frequency Division Multiplexing) in the downlink (i.e., from a network node (e.g., gNB, eNB, or base station) to a wireless device (e.g., user equipment or UE). In the uplink (i.e., from wireless device to network node), both OFDM and DFT-spread OFDM (DFT-S-OFDM), also known as SC-FDMA in LTE, will be supported. The basic NR physical resource can thus be seen as a time-frequency grid as illustrated in FIG. 1, where a resource block (RB) in a 14-symbol slot is shown. A resource block corresponds to 12 contiguous subcarriers in the frequency domain. Resource blocks are numbered in the frequency domain, starting with 0 from one end of the system bandwidth. Each resource element corresponds to one OFDM subcarrier during one OFDM symbol interval.

Different subcarrier spacing values are supported in NR. The supported subcarrier spacing values (also referred to as different numerologies) are given by $\Delta f = (15 \times 2^\mu)$ kHz where $\mu$ is a non-negative integer and can be one of $\{0,1,2,3,4\}$. $\Delta f = 15$ kHz (e.g., $\mu = 0$) is the basic (or reference) subcarrier spacing that is also used in LTE. $\mu$ is also referred to as the numerology.

In the time domain, downlink and uplink transmissions in NR may be organized into equally-sized subframes of 1 ms each, similar to LTE. A subframe is further divided into multiple slots of equal duration. The slot length is dependent on the subcarrier spacing or numerology and is given by $$\frac{1}{2^\mu}$$

ms. Each slot consists of 14 OFDM symbols for normal Cyclic Prefix (CP).

It is understood that, data scheduling in NR can be at the slot level. An example is shown in FIG. 2 with a 14-symbol slot, where the first two symbols contain control channel (PDCCH) and the rest contain data channel (PDCH), either PDSCH (physical downlink shared channel) or PUSCH (physical uplink shared channel).

Downlink (DL) transmissions can be either dynamically scheduled, in which the network node transmits a DL assignment via downlink control information (DCI) carried over PDCCH (Physical Downlink Control Channel) to a wireless device for each PDSCH, or semi-persistently scheduled (SPS), in which one or more DL SPS are semi-statically configured and each can be activated or deactivated by a DCI. When a PDCCH for DL PDSCH scheduling is detected, the decoding status of the corresponding PDSCH is sent back to the network node in a form of a HARQ-Ack (Hybrid automatic repeat request acknowledgment) over a Physical Uplink Control Channel (PUCCH) resource.

Similarly, uplink (UL) transmissions can also be either dynamically scheduled, in which the network node transmits an uplink grant via DCI over PDCCH to a wireless device for each PUSCH transmission, or semi-persistently scheduled (SPS), in which one or more UL configured grants (CGs) are semi-statically configured and each can be activated or deactivated by a DCI.

DL Reference Signals

In NR, a wireless device performs initial cell search and DL time and frequency synchronization through a primary synchronization signal SS (PSS), a secondary SS (SSS), and a PBCH (Physical Broadcast Channel). PSS, SSS and PBCH are transmitted together periodically in consecutive symbols and form a SS/PBCH block, or SSB in short.

A Channel State Information Reference Signal (CSI-RS) is used in NR for downlink channel measurement, in which CSI-RS is transmitted over one or more antenna ports. CSI-RS for this purpose is also referred to as Non-Zero Power (NZP) CSI-RS. The supported number of antenna ports (or CSI-RS ports) in NR are $\{1, 2, 4, 8, 12, 16, 24, 32\}$.

A Tracking Reference Signal (TRS) in NR is a special NZP CSI-RS and is used for time and frequency tracking in the downlink. A wireless device can be configured with one or more periodic TRS, or one or more periodic TRS and aperiodic TRS in NR. For a periodic TRS, it has a periodicity and a slot offset. The periodicity can one of $2^\mu X_p$ slots where $X_p = 10, 20, 40,$ or $80$. A TRS occupies multiple RBs. When a NZP CSI-RS resource set contains "trs-info", then the NZP CSI-RS resource set is for TRS.

DL Transmission with Multiple Transmission/Reception Points (TRPs)

In 3GPP NR Release 15 (i.e., Third Generation Partnership Project (3GPP) Release 15), a single TRP is assumed for UL reception. In the DL, dynamic transmission point selection (DPS) is supported in which TRP can be dynamically selected for Physical Downlink Shared Channel (PDSCH) transmission to a wireless device. A different TRP may be selected at different slots.

In 3GPP NR Rel-16 (i.e., 3GPP Release 16), non-coherent joint transmission (NC-JT) is introduced in which different MIMO layers of a PDSCH to a wireless device can be transmitted from different TRPs. Furthermore, for increased reliability, the network node may also transmit a PDSCH from different TRPs in different slots or mini-slots to a wireless device. FIG. 3 is a diagram illustrating an example of transmission and reception with two TRPs, where for each TRP is associated with one more DL RS.

Since different TRPs may be at different physical locations, the propagation channels to the wireless device can be different and different transmit beams may be used in the TRPs. To receive signals from different TRPs, different receive beams may also be used at the wireless device.

To facilitate receiving PDSCH or PDCCH from different TRPs or different beams within the same or different TRP, TCI (transmission configuration indicator) states were introduced in NR Rel-15. A TCI state contains Quasi Co-location (QCL) information between a DMRS (demodulation reference signal) for PDSCH/PDCCH and one or two DL reference signals (also referred to as QCL source RS) such as TRS or SSB. Certain channel properties of the DMRS can be obtained from the associated QCL source RS. The supported QCL information types in NR are:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

In the UL, to facilitate PUCCH/PUSCH/SRS(Sounding Reference Signal) transmission toward different TRPs, the notion of "spatial relation" was introduced in NR. When an UL signal is spatially related to a DL RS, the wireless device should transmit the UL signal in the opposite (reciprocal) direction from which the DL RS was previously received. More precisely, the wireless device may apply the "same" spatial filtering configuration that it used previously to receive the spatially related DL RS for transmission of the UL signal. When an UL signal is spatially related to a UL RS, the wireless device may apply the "same" spatial filter as for transmitting the UL RS. Here, the terminology "spatial filtering configuration" may refer to the antenna weights that are applied at either the transmitter or the receiver for data/control transmission/reception.

In addition, for UL transmit power control, a DL RS is also needed for estimating the pathloss between a TRP and the wireless device, such a DL RS is referred to as a pathloss RS. For transmitting to different TRPs, different DL RS may be indicated to a wireless device.

For UL transmission, it is generally assumed that the timing and frequency acquired in the DL is also used to derive the timing and frequency for UL transmission. In case of TDD, the same DL frequency is used also for UL transmission. In case of FDD, a different frequency is used in the UL and thus the acquired DL frequency is used as a reference to derive the UL frequency. In NR, a wireless device is required to achieve certain frequency tracking accuracy, typically within 0.1 ppm (parts per million). For UL timing, a time advance (TA) command is used to request a wireless device to adjust its UL transmission timing with respect to the acquired DL timing.

For a single TRP network, a wireless device may derive its UL time and frequency based on a DL RS, TRS/SSB in NR. For UL transmission in NR with multiple TRPs, there are multiple DL TRS for DL time and frequency tracking, which may make deriving UL time or frequency an issue.

Further, for multiple TRPs transmission and reception in NR, existing systems assume that the TRPs are synchronized both in time and frequency. Thus, regardless of which TRP a UL signal is transmitted to, a same time and frequency derived from a DL RS can be used. However, the assumption of fully time and frequency synchronization among the TRPs may not always be true in some deployment scenarios. In that case, using a single DL RS for deriving the time or frequency for UL transmission to different TRPs may not be valid anymore.

SUMMARY

Some embodiments advantageously provide methods, systems, and apparatuses for timing and/or frequency derivation for uplink transmission in a network with multiple TRPs.

One or more embodiments related to an explicit time or frequency relation that is configured between an UL signal and a DL RS. The time or frequency relation may be semi-statically configured or dynamically signaled to a wireless device.

The one or more embodiments may allow for the network node to indicate which DL RS is used to derive the time or frequency for a UL transmission, which may be desired in case that different DL frequencies or timings may exist between TRPs.

According to one aspect of the present disclosure, a network node is provided. The network node is configured to communicate with a wireless device using at least one of a plurality of transmission and reception points, TRPs. According to one or more embodiments of this aspect, the network node includes processing circuitry configured to indicate to the wireless device a first downlink reference signal, DL RS, of a plurality of downlink reference signals, DL RSs, to use for deriving an uplink, UL, transmission parameter for an UL transmission, each of the plurality of DL RSs being associated with a respective one of the plurality of TRPs. According to one or more embodiments of this aspect, the processing circuitry is further configured to receive the UL transmission, the UL transmission being based on the derived UL transmission parameter.

According to one or more embodiments of this aspect, the indication defines at least one of a timing relation and a frequency relation between the first DL RS and the UL transmission.

According to one or more embodiments of this aspect, the UL transmission parameter is one of a frequency parameter and a timing parameter.

According to one or more embodiments of this aspect, the processing circuitry is further configured to one of semi-statically configure the indication and dynamically configure the indication.

According to one or more embodiments of this aspect, the indication is signaled using a Medium Access Control, MAC, Control Element, CE.

According to one or more embodiments of this aspect, the indication is signaled using a Downlink Control Information, DCI, format.

According to one or more embodiments of this aspect, the indication is signaled using radio resource control, RRC, signaling.

According to one or more embodiments of this aspect, the indication is one of explicit and implicit.

According to one or more embodiments of this aspect, the plurality of DL RSs include at least one of: a tracking reference signal, TRS, a synchronization signal block, SSB, and a channel state information reference signal, CSI-RS; and the UL transmission includes at least one of: a physical uplink shared channel, PUSCH, a physical uplink control channel, PUCCH, and a sounding reference signal, SRS.

According to one aspect of the present disclosure, a wireless device is provided. According to one or more embodiments of this aspect, the wireless device is configured to communicate with a network node via at least one of a plurality of transmission and reception points, TRPs. According to one or more embodiments of this aspect, the wireless device includes processing circuitry configured to:

receive an indication of a first downlink reference signal, DL RS, of a plurality of DL RSs, each of the plurality of DL RSs being associated with a respective one of the plurality of TRPs. According to one or more embodiments of this aspect, the processing circuitry is further configured to derive a parameter for an uplink, UL, transmission based on the first DL RS, and cause the UL transmission based on the derived UL transmission parameter.

According to one or more embodiments of this aspect, the indication defines at least one of a timing relation and a frequency relation between the first DL RS and the UL transmission.

According to one or more embodiments of this aspect, the UL transmission parameter is one of a frequency parameter and a timing parameter.

According to one or more embodiments of this aspect, the indication is one of a semi-statically configured indication and a dynamically configured indication.

According to one or more embodiments of this aspect, the indication is signaled using a Medium Access Control, MAC, Control Element, CE.

According to one or more embodiments of this aspect, the indication is signaled using a Downlink Control Information, DCI, format.

According to one or more embodiments of this aspect, the indication is signaled using radio resource control, RRC, signaling.

According to one or more embodiments of this aspect, the indication is one of explicit and implicit.

According to one or more embodiments of this aspect, the plurality of DL RSs include at least one of: a tracking reference signal, TRS, a synchronization signal block, SSB, and a channel state information reference signal, CSI-RS; and the UL transmission includes at least one of: a physical uplink shared channel, PUSCH, a physical uplink control channel, PUCCH, and a sounding reference signal, SRS.

According to another aspect of the present disclosure, a method implemented by a network node is provided. According to one or more embodiments of this aspect, the network node is configured to communicate with a wireless device using at least one of a plurality of transmission and reception points, TRPs. According to one or more embodiments of this aspect, the method includes indicating to the wireless device a first downlink reference signal, DL RS, of a plurality of downlink reference signals, DL RSs, to use for deriving an uplink, UL, transmission parameter for an UL transmission, each of the plurality of DL RSs being associated with a respective one of the plurality of TRPs. According to one or more embodiments of this aspect, the method further includes receiving the UL transmission, the UL transmission being based on the derived UL transmission parameter.

According to one or more embodiments of this aspect, the indication defines at least one of a timing relation and a frequency relation between the first DL RS and the UL transmission.

According to one or more embodiments of this aspect, the UL transmission parameter is one of a frequency parameter and a timing parameter.

According to one or more embodiments of this aspect, the method further includes one of: semi-statically configuring the indication, and dynamically configuring the indication.

According to one or more embodiments of this aspect, the indication is signaled using a Medium Access Control, MAC, Control Element, CE.

According to one or more embodiments of this aspect, the indication is signaled using a Downlink Control Information, DCI, format.

According to one or more embodiments of this aspect, the indication is signaled using radio resource control, RRC, signaling.

According to one or more embodiments of this aspect, the indication is one of explicit and implicit.

According to one or more embodiments of this aspect, the plurality of DL RSs include at least one of: a tracking reference signal, TRS, a synchronization signal block, SSB, and a channel state information reference signal, CSI-RS; and the UL transmission includes at least one of: a physical uplink shared channel, PUSCH, a physical uplink control channel, PUCCH, and a sounding reference signal, SRS.

According to another aspect of the present disclosure, a method implemented by a wireless device is provided. According to one or more embodiments of this aspect, the wireless device is configured to communicate with a network node via at least one of a plurality of transmission and reception points, TRPs. According to one or more embodiments of this aspect, the method includes receiving an indication of a first downlink reference signal, DL RS, of a plurality of DL RSs, each of the plurality of DL RSs being associated with a respective one of the plurality of TRPs. According to one or more embodiments of this aspect, the method further includes deriving a parameter for an uplink, UL, transmission based on the first DL RS, and causing the UL transmission based on the derived UL transmission parameter.

According to one or more embodiments of this aspect, the indication defines at least one of a timing relation and a frequency relation between the first DL RS and the UL transmission.

According to one or more embodiments of this aspect, the UL transmission parameter is one of a frequency parameter and a timing parameter.

According to one or more embodiments of this aspect, the indication is one of a semi-statically configured indication and a dynamically configured indication.

According to one or more embodiments of this aspect, the indication is signaled using a Medium Access Control, MAC, Control Element, CE.

According to one or more embodiments of this aspect, the indication is signaled using a Downlink Control Information, DCI, format.

According to one or more embodiments of this aspect, the indication is signaled using radio resource control, RRC, signaling.

According to one or more embodiments of this aspect, the indication is one of explicit and implicit.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 6 is a flowchart illustrating example methods implemented in a communication system including a host computer, a network node and a wireless device for executing a client application at a wireless device according to some embodiments of the present disclosure;

FIG. 7 is a flowchart illustrating example methods implemented in a communication system including a host computer, a network node and a wireless device for receiving user data at a wireless device according to some embodiments of the present disclosure;

FIG. 10 is a flowchart of an example process in a network node according to some embodiments of the present disclosure;

FIG. 11 is a flowchart of another example process in a network node according to some embodiments of the present disclosure;

DETAILED DESCRIPTION

Figure 1:
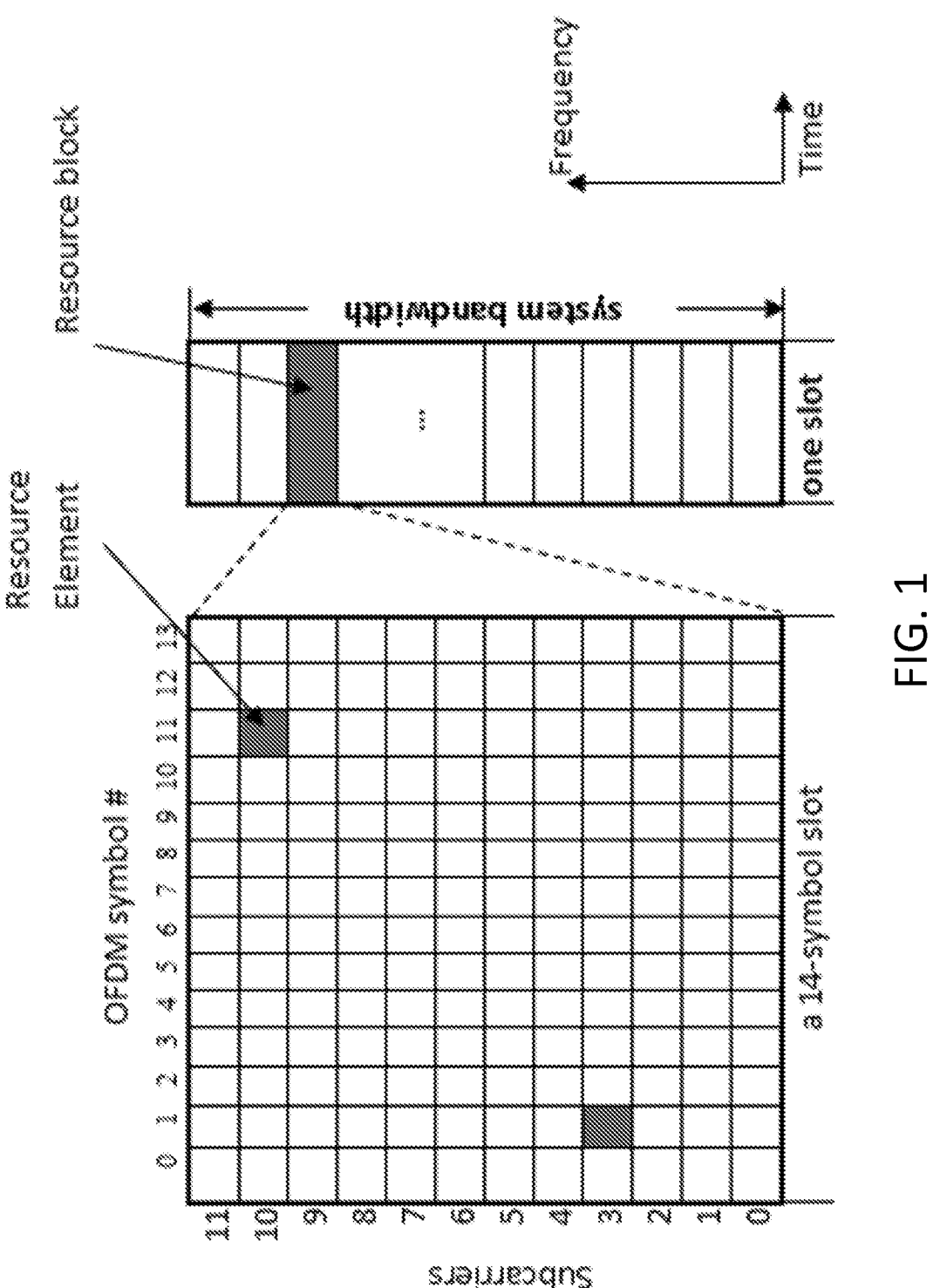
FIG. 1 is a diagram of NR physical resources.
Figures 2, 3:
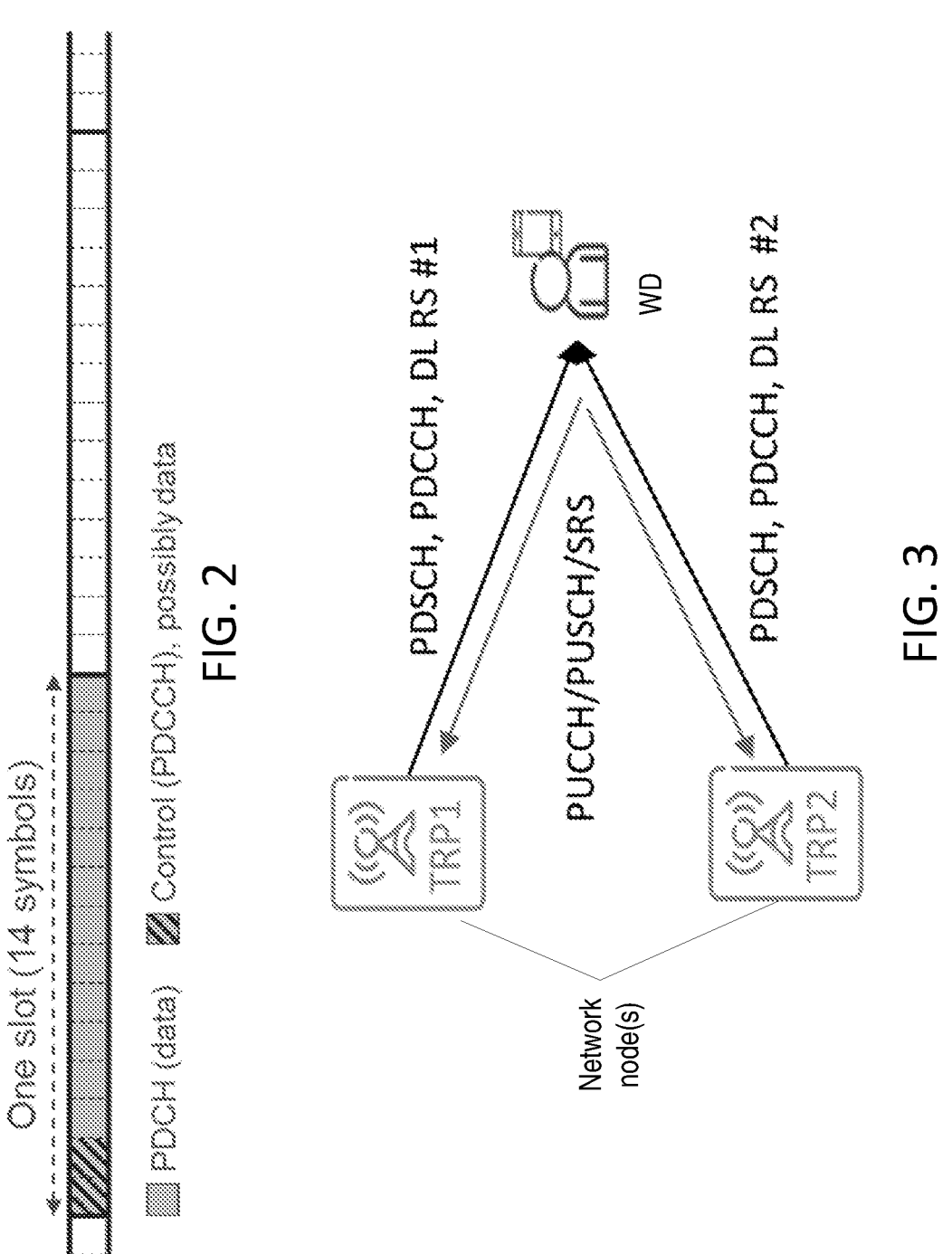
FIG. 2 is a diagram of a NR time-domain structure with 15 kHz subcarrier spacing.
FIG. 3 is a diagram of an example of a transmission and reception with multiple TRPs.

Before describing in detail example embodiments, it is noted that the embodiments reside primarily in combinations of apparatus components and processing steps related to timing and/or frequency derivation for uplink transmission in a network with multiple TRPs. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes"

and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information.

Transmitting in downlink may pertain to transmission from the network or network node to the wireless device. Transmitting in uplink may pertain to transmission from the wireless device to the network or network node. Transmitting in sidelink may pertain to (direct) transmission from one wireless device to another. Uplink, downlink and sidelink (e.g., sidelink transmission and reception) may be considered communication directions. In some variants, uplink and downlink may also be used to described wireless communication between network nodes, e.g., for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Transmission/Reception Point (TRP): In some embodiments, a TRP may be either a network node, a radio head, a spatial relation, or a Transmission Configuration Indicator (TCI) state. A TRP may be represented by a spatial relation or a TCI state in some embodiments. In some embodiments, a TRP may be using multiple TCI states. In some embodiments, a TRP may a part of the network node, e.g., gNB, transmitting and receiving radio signals to/from wireless devices according to physical layer properties and parameters inherent to that element. In some embodiments, such as in Multiple Transmit/Receive Point (multi-TRP) operation, a serving cell can schedule a wireless device from two TRPs, providing better PDSCH coverage, reliability and/or data rates as compared with other arrangements. There are two different operation modes for multi-TRP: single-DCI and multi-DCJ. For both modes, control of uplink and downlink operation is done by both physical layer and MAC. In single-DCI mode, wireless device is scheduled by the same DCI for both TRPs and in multi-DCI mode, wireless device is scheduled by independent DCIs from each TRP.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 4:
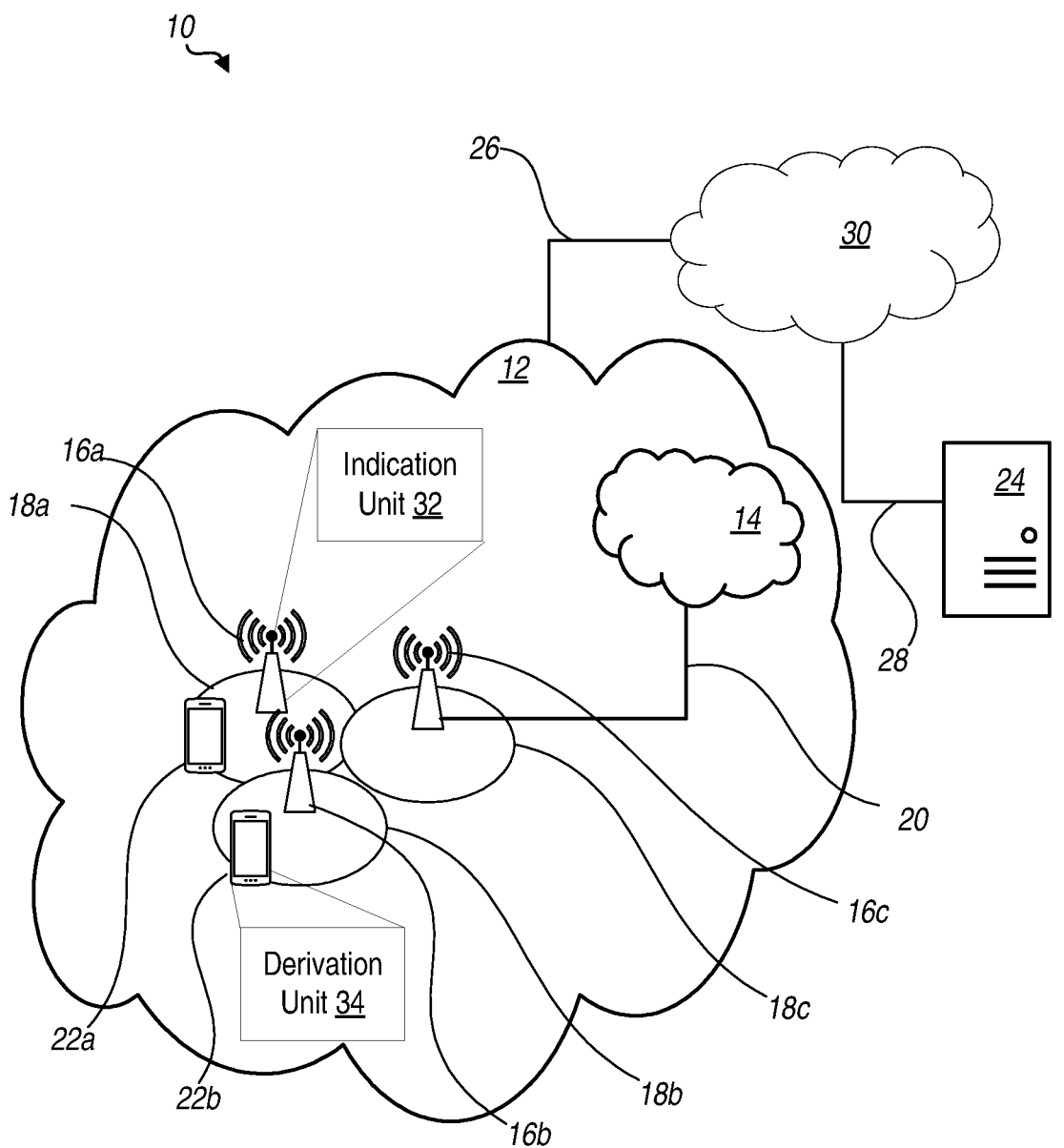
FIG. 4 is a schematic diagram of an example network architecture illustrating a communication system connected via an intermediate network to a host computer according to the principles in the present disclosure.

Some embodiments provide timing and/or frequency derivation for uplink transmission in a network with multiple TRPs. Referring again to the drawing figures, in which like elements are referred to by like reference numerals, there is shown in FIG. 4 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. Further, each network node 16 may be a transmission and reception point (TRP) and/or be associated with one or more TRP and/or may be one or more TRPs be part of network node 16, as described herein. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 4 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include an indication unit 32 which is configured to perform one or more network node 16 functions as described herein such as with respect to timing and/or frequency derivation for uplink transmission in a network with multiple TRPs. A wireless device 22 is configured to include a derivation unit 34 which is configured to perform one or more wireless device 22 functions as described herein such as with respect to timing and/or frequency derivation for uplink transmission in a network with multiple TRPs.

Example implementations, in accordance with an embodiment, of the WD 22, network node 16 and host computer 24 discussed in the preceding paragraphs will now be described with reference to FIG. 5. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to process, store, derive, signal, forward, relay, transmit, receive, etc., information related to timing and/or frequency derivation for uplink transmission in a network with multiple TRPs.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include indication unit 32 configured to perform one or more network node 16 functions as described herein such as with respect to timing and/or frequency derivation for uplink transmission in a network with multiple TRPs.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a derivation unit 34 configured to perform one or more wireless device 22 functions as described herein such as with respect to timing and/or frequency derivation for uplink transmission in a network with multiple TRPs. In some embodiments, only some of the steps/actions may be performed by a WD 22. In some of these embodiments, results associated with steps not performed by the WD 22 are either performed elsewhere and derived and/or/obtained by the WD in a different manner, or they may be replaced by alternate steps.

Figure 5:
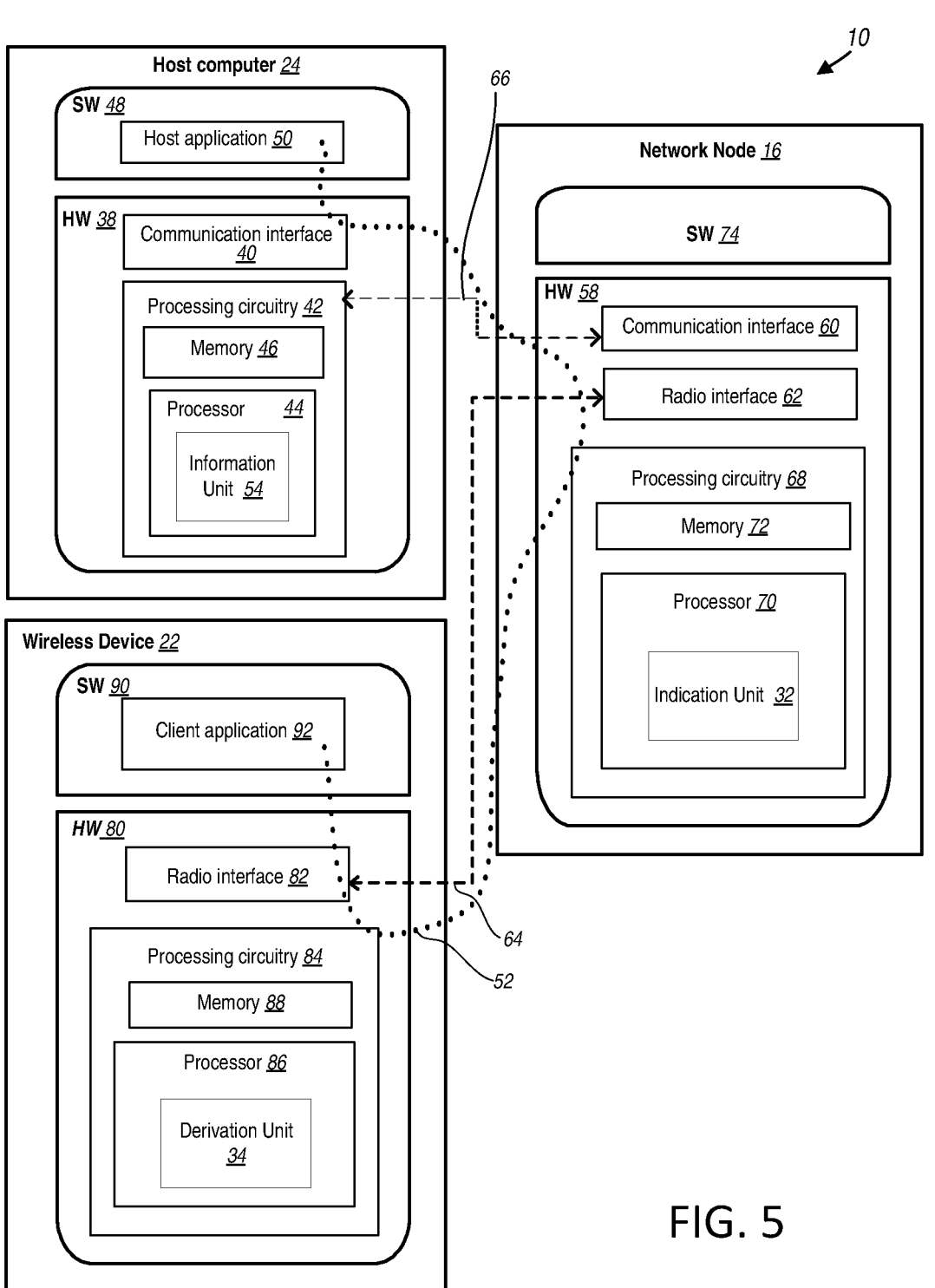
FIG. 5 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 5 and independently, the surrounding network topology may be that of FIG. 4.

In FIG. 5, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors, etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 4 and 5 show various "units" such as indication unit 32, and derivation unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 6 is a flowchart illustrating an example method implemented in a communication system, such as, for example, the communication system of FIGS. 4 and 5, in accordance with one embodiment. The communication system may include a host computer 24, a network node 16 and a WD 22, which may be those described with reference to FIG. 5. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 7 is a flowchart illustrating an example method implemented in a communication system, such as, for example, the communication system of FIG. 4, in accordance with one embodiment. The communication system may include a host computer 24, a network node 16 and a WD 22, which may be those described with reference to FIGS. 4 and 5. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 8, 9:
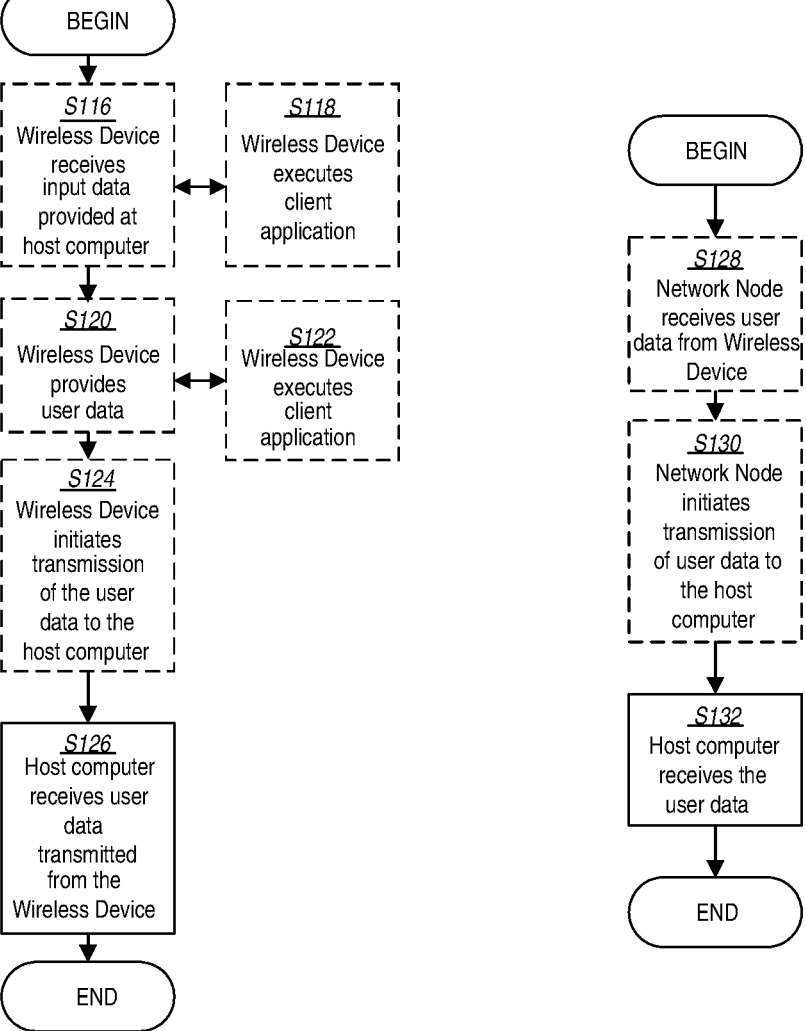
FIG. 8 is a flowchart illustrating example methods implemented in a communication system including a host computer, a network node and a wireless device for receiving user data from the wireless device at a host computer according to some embodiments of the present disclosure.
FIG. 9 is a flowchart illustrating example methods implemented in a communication system including a host computer, a network node and a wireless device for receiving user data at a host computer according to some embodiments of the present disclosure.

FIG. 8 is a flowchart illustrating an example method implemented in a communication system, such as, for example, the communication system of FIG. 4, in accordance with one embodiment. The communication system may include a host computer 24, a network node 16 and a WD 22, which may be those described with reference to FIGS. 4 and 5. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 9 is a flowchart illustrating an example method implemented in a communication system, such as, for example, the communication system of FIG. 4, in accordance with one embodiment. The communication system may include a host computer 24, a network node 16 and a WD 22, which may be those described with reference to FIGS. 4 and 5. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

FIG. 10 is a flowchart of an example process in a network node 16 according to some embodiments of the present disclosure. One or more Blocks and/or functions performed by network node 16 may be performed by one or more elements of network node 16 such as by indication unit 32 in processing circuitry 68, processor 70, radio interface 62, etc. In one or more embodiments, network node 16 is configured to indicate (Block S134) one of a plurality of downlink reference signals, DL RSs, to use for deriving time or frequency for uplink, UL, transmission where the plurality of DL RSs are associated the plurality of TRPs, as described herein. In one or more embodiments, network node 16 is configured to optionally receive (Block S136) an uplink transmission that is based on the indication, as described herein.

According to one or more embodiments, the processing circuitry 68 is further configured to pre-compensate a doppler shift between at least two of the plurality of TRPs. According to one or more embodiments, the plurality of TRPs are not one of frequency synchronized and time aligned with each other. According to one or more embodiments, the processing circuitry 68 is further configured one of semi-statically and dynamically configure the indication. According to one or more embodiments, the indication is signaled using a Medium Access Control, MAC, Control Element, CE. According to one or more embodiments, the plurality of DL RSs include at least one of tracking reference signal, TRS, synchronization signal block, SSB, and channel state information reference signal, CSI-RS where the uplink signal includes at least one of physical uplink shared channel, PUSCH, physical uplink control channel, PUCCH, and sounding reference signal, SRS.

FIG. 11 is a flowchart of an example process in a network node 16 according to some embodiments of the present disclosure. One or more Blocks and/or functions performed by network node 16 may be performed by one or more elements of network node 16 such as by indication unit 32 in processing circuitry 68, processor 70, radio interface 62, etc. In one or more embodiments, network node 16 is configured to indicate (Block S138) to the wireless device a first downlink reference signal, DL RS, of a plurality of downlink reference signals, DL RSs, to use for deriving an uplink, UL, transmission parameter for an UL transmission, each of the plurality of DL RSs being associated with a respective one of the plurality of TRPs. In one or more embodiments, network node 16 is configured to receive (Block S140) the UL transmission, the UL transmission being based on the derived UL transmission parameter.

According to one or more embodiments, the indication defines at least one of a timing relation and a frequency relation between the first DL RS and the UL transmission. According to one or more embodiments, the UL transmission parameter is one of a frequency parameter and a timing parameter. According to one or more embodiments, the processing circuitry (68) is further configured to one of semi-statically configure the indication and dynamically configure the indication. According to one or more embodiments, the indication is signaled using a Medium Access Control, MAC, Control Element, CE. According to one or more embodiments of this aspect, the indication is signaled using a Downlink Control Information, DCI, format. According to one or more embodiments of this aspect, the indication is signaled using radio resource control, RRC, signaling. According to one or more embodiments of this aspect, the indication is one of explicit and implicit. According to one or more embodiments, the plurality of DL RSs include at least one of: a tracking reference signal, TRS, a synchronization signal block, SSB, and a channel state information reference signal, CSI-RS; and the UL transmission includes at least one of: a physical uplink shared channel, PUSCH, a physical uplink control channel, PUCCH, and a sounding reference signal, SRS.

Figures 12, 13:
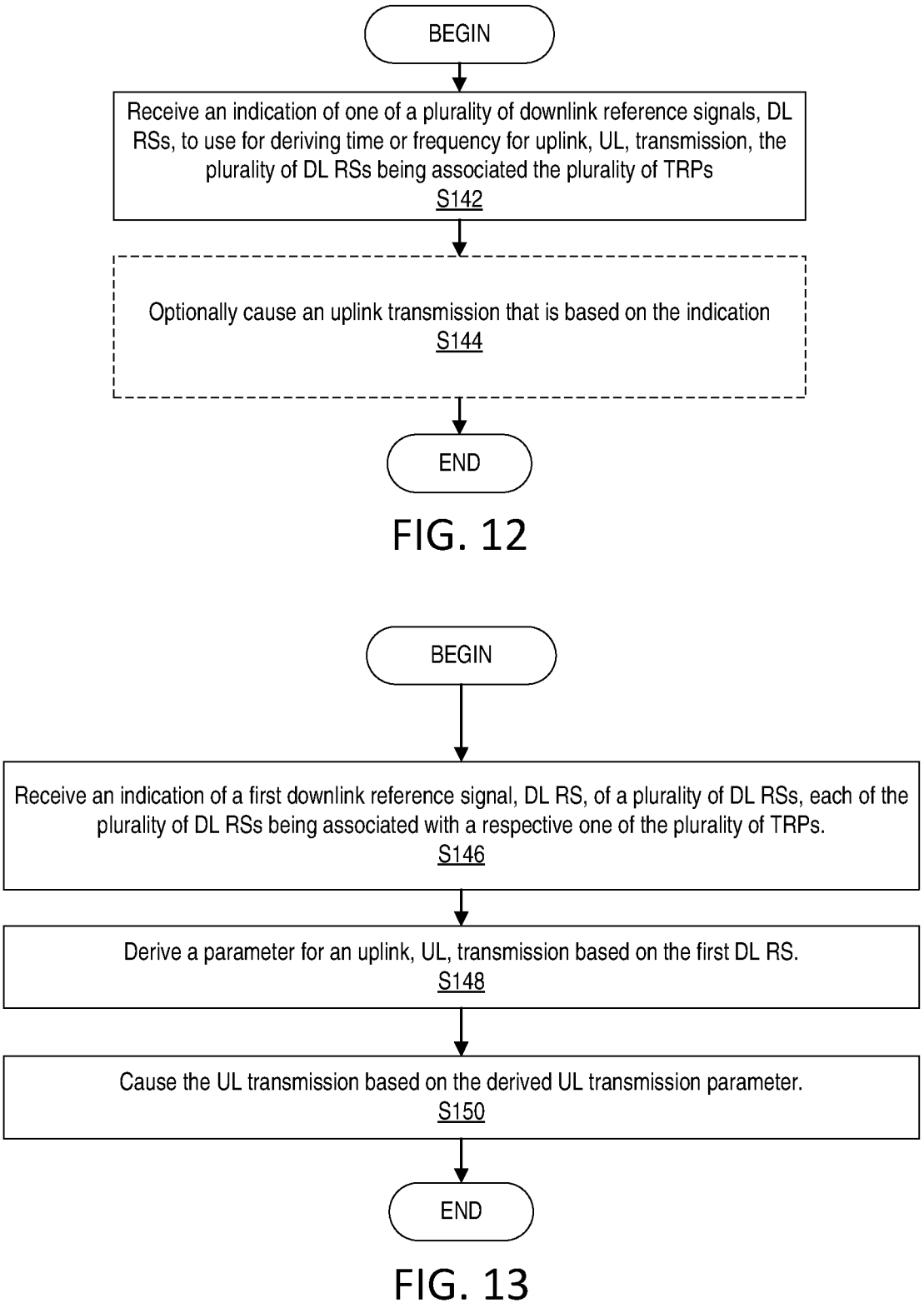
FIG. 12 is a flowchart of an example process in a wireless device according to some embodiments of the present disclosure.
FIG. 13 is a flowchart of another example process in a wireless device according to some embodiments of the present disclosure.

FIG. 12 is a flowchart of an example process in a wireless device 22 according to some embodiments of the present disclosure. One or more Blocks and/or functions performed by wireless device 22 may be performed by one or more elements of wireless device 22 such as by derivation unit 34 in processing circuitry 84, processor 86, radio interface 82, etc. In one or more embodiments, wireless device 22 is configured to receive (Block S142) an indication of one of a plurality of downlink reference signals, DL RSs, to use for deriving time or frequency for uplink, UL, transmission where the plurality of DL RSs are associated the plurality of TRPs, as described herein. In one or more embodiments, wireless device 22 is configured to optionally cause (Block S144) an uplink transmission that is based on the indication, as described herein.

According to one or more embodiments, the plurality of TRPs are not one of frequency synchronized and time aligned with each other. According to one or more embodiments, the indication is one of a semi-statically and dynami-cally configured indication. According to one or more embodiments, the indication is signaled using a Medium Access Control, MAC, Control Element, CE. According to one or more embodiments, the plurality of DL RSs include at least one of tracking reference signal, TRS, synchroniza-tion signal block, SSB, and channel state information ref-erence signal, CSI-RS, and where the uplink signal includes at least one of physical uplink shared channel, PUSCH, physical uplink control channel, PUCCH, and sounding reference signal, SRS.

FIG. 13 is a flowchart of an example process in a wireless device 22 according to some embodiments of the present disclosure. One or more Blocks and/or functions performed by wireless device 22 may be performed by one or more elements of wireless device 22 such as by derivation unit 34 in processing circuitry 84, processor 86, radio interface 82, etc. In one or more embodiments, wireless device 22 is configured to receive (Block S146) an indication of a first downlink reference signal, DL RS, of a plurality of DL RSs, each of the plurality of DL RSs being associated with a respective one of the plurality of TRPs. In one or more embodiments, wireless device 22 is configured to derive (Block S148) a parameter for an uplink, UL, transmission based on the first DL RS. In one or more embodiments, wireless device 22 is configured to cause (Block S150) the UL transmission based on the derived UL transmission parameter.

According to one or more embodiments, the indication defines at least one of a timing relation and a frequency relation between the first DL RS and the UL transmission. According to one or more embodiments, the UL transmis-sion parameter is one of a frequency parameter and a timing parameter. According to one or more embodiments, the indication is one of a semi-statically configured indication and a dynamically configured indication. According to one or more embodiments, the indication is signaled using a Medium Access Control, MAC, Control Element, CE. According to one or more embodiments of this aspect, the indication is signaled using a Downlink Control Informa-tion, DCI, format. According to one or more embodiments of this aspect, the indication is signaled using radio resource control, RRC, signaling. According to one or more embodi-ments of this aspect, the indication is one of explicit and implicit.

Having generally described arrangements for timing and/ or frequency derivation for uplink transmission in a network with multiple TRPs, details for these arrangements, func-tions and processes are provided as follows, and which may be implemented by the network node 16, wireless device 22 and/or host computer 24. In particular, one or more network node 16 functions described below may be performed by one or more of processing circuitry 68, processor 70, indi-cation unit 32, radio interface 62, etc. Further, one or more wireless device 22 functions described below may be per-formed by one or more of processing circuitry 84, processor 86, derivation unit 34, radio interface 82, etc. Further, one or more host computer 24 functions described below may be performed by one or more of processing circuitry 42, processor 44, information unit 54, communication interface 40, etc. Further, as noted above, in some embodiments, a TRP may be either a network node 16, a radio head, a spatial relation, or a Transmission Configuration Indicator (TCI) state. A TRP may be represented by a spatial relation or a TCI state in some embodiments. In some embodiments, a TRP may be using multiple TCI states. In some embodi-ments, a TRP may a part of network node 16 (e.g., gNB) transmitting and receiving radio signals to/from WD 22 according to physical layer properties and parameters inherent to that element. In some embodiments, in Multiple Transmit/Receive Point (multi-TRP) operation, a serving cell can schedule WD 22 from two TRPs, providing better PDSCH coverage, reliability and/or data rates. There are two different operation modes for multi-TRP: single-DCI and multi-DCI. For both modes, control of uplink and downlink operation is done by both physical layer and MAC. In single-DCI mode, WD 22 is scheduled by the same DCI for both TRPs and in multi-DCI mode, WD 22 is scheduled by independent DCIs from each TRP.

Further, while the embodiments below are described in terms of TRPs, a TRPs are described from the perspective of a network node 16 for ease of understanding. However, it is noted that such description is not intended to limit embodiments only to network nodes 16. A TRP may correspond to, for example, network node 16, part of network node 16, etc., as described and defined above.

Some embodiments provide timing and/or frequency derivation for uplink transmission in a network with multiple TRPs.

Indication of Time or Frequency Relation Between a UL Signal and a DL RS

In one or more embodiments, a wireless device 22 is configured to receive DL signals from one or more TRPs and transmit UL signals to one or more TRPs. For an UL signal, the wireless device 22 may be indicated with a DL RS for which its UL time or frequency is related to. When a UL signal is related to a DL RS in time, the time acquired from the DL RS would be used for the UL signal transmission. When a UL signal is related to a DL RS in frequency, the same frequency acquired from the DL RS would be used for the UL signal transmission in case of TDD. In case of FDD, the frequency acquired from the DL RS would be used to derive the UL frequency for the UL signal transmission.

The DL RS can be one or more of TRS, SSB and CSI-RS. The UL signal can be one or more of PUSCH, PUCCH and SRS in NR.

Figure 14:
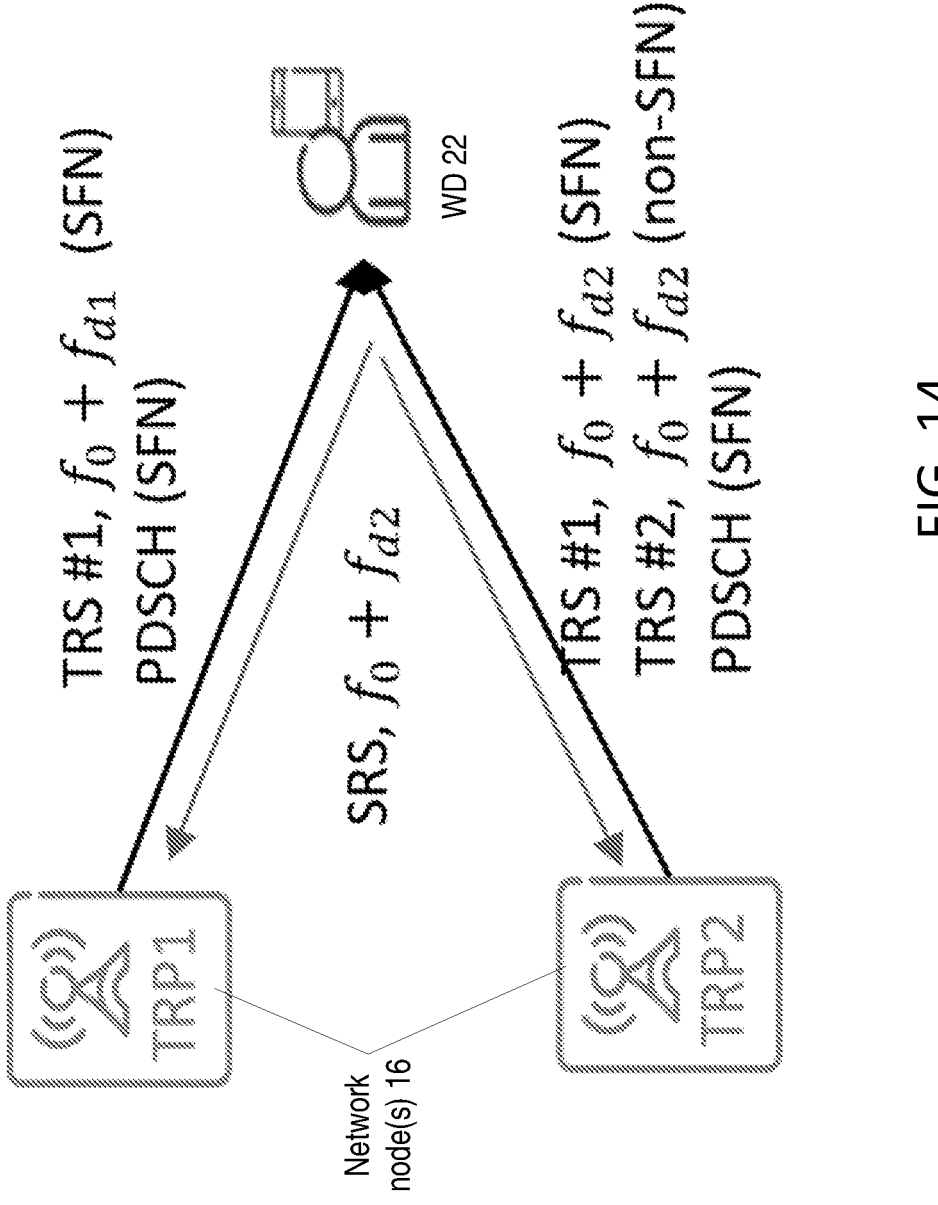
FIG. 14 is a diagram of an example linking an uplink SRS transmission with a DL TRS as described herein.

Using FIG. 14 as an example, a wireless device 22 is configured with two TRPs and TRS #1 is transmitted in an SFN (single Frequency network) manner from both TRPs while TRS #2 is transmitted only from TRP #2. A PDSCH is transmitted from both TRPs in a SFN manner. In one or more embodiments, network node 16 includes both TRP #1 and TRP #2 (i.e., both TRPs are part of network node 16) such that they may be considered extensions of network node 16 where one or more TRPs may co-located with network node 16 while one or more other TRPs may not be co-located with the network node 16. The two TRPs may be frequency synchronized but may have different Doppler frequencies due to wireless device 22 movement, thus the wireless device 22 may acquire different DL frequencies from the two TRS.

The difference of the two Doppler frequencies can be large at high carrier frequencies and/or due to fast wireless device 22 movement, which may be a problem. One solution is to pre-compensate the Doppler shift at the network node 16 by estimating the difference of the Doppler frequencies from the two TRPs based on UL SRS. For that purpose, network node 16 may need the wireless device 22 to derive the UL frequency based on TRS #2 for UL SRS transmission, which would be $f_0+f_{d2}$, ideally, and transmit a SRS with a frequency of $f_0+f_{d2}$ to both TRPs. The network node 16 then estimates the received UL SRS frequency difference at the two TRPs as $\Delta f=(f_0+^2f_{d2})-(f_0+f_{d2}+f_{d1})=f_{d2}-f_{d1}$. The network node 16 may apply a transmit frequency $f_0+\Delta f$ to a PDSCH transmitted from TRP #1 so that, at the wireless device, the received PDSCH from TRP #1 may have a same center frequency of $f_0+f_{d2}$ as from TRP #2. The Doppler spread would be thus reduced, which can be handled with a general wireless device 22 receiver. For PDSCH reception, TRS #1 transmitted in an SFN manner can be used for average delay and delay spread estimation while TRS #2 can be used for Doppler shift and spread estimation. In this example, a wireless device 22 needs to be indicated to derive the SRS transmission frequency based on TRS #2, not TRS #1, even though the two TRPs are synchronized in time and frequency.

In some scenarios, the multiple TRPs may not be frequency synchronized. In these cases, when transmitting an UL signal to a TRP, the network node 16 may want the wireless device 22 to use a DL TRS from the same TRP for deriving the UL frequency. Thus, depending on which TRP an UL signal is transmitted to, different DL TRS may be indicated as the frequency reference.

Similarly, in some scenarios, the multiple TRPs may not be fully time aligned. In these cases, when transmitting a UL signal to a TRP, network node 16 may want wireless device 22 to use a DL TRS from the same TRP to derive the UL timing. Thus, depending on which TRP a UL signal is transmitted to, different DL TRS may be indicated as the time reference for deriving at least one characteristic (e.g., time, frequency, etc.) associated with the UL signal.

The time or frequency relation for an UL signal may be semi-statically configured for each PUCCH and SRS resource or set of resources. Different resources may be dynamically indicated to select different time or frequency relations. Alternatively, a PUCCH or SRS resource or a resource set may be configured with more than one time or frequency relation and where one of the plurality of time and/or frequency relations is activated/deactivated by a MAC (Medium Access Control) Control Element (CE).

In one embodiment, a common set of time and/or frequency reference signals may be configured. An example is shown below using the ASN.1 (Abstract Syntax Notation One) format below, where maxNrofTimeReferenceRSs and maxNrofFrequencyReferenceRSs are respectively the maximum number of time and frequency reference signals that may be configured.

```
TimeReferenceRS ::=          SEQUENCE {
    timeReferenceRS-Id       TimeReferenceRS-Id,
    referenceSignal              CHOICE {
        ssb-Index                SSB-Index,
        csi-RS-Index                NZP-CSI-RS-ResourceId
    }
FrequencyReferenceRS ::=          SEQUENCE {
    frequencyReferenceRS-Id       FrequencyReferenceRS-Id,
    referenceSignal              CHOICE {
```

-continued

```
    ssb-Index                    SSB-Index,
    csi-RS-Index                 NZP-CSI-RS-ResourceId
}
TimeReferenceRS-Id ::=          INTEGER (0..maxNrofTimeReferenceRSs-1)
FrequencyReferenceRS-Id ::=     INTEGER (0..maxNrofFrequencyReferenceRSs-1)
```

For each PUCCH and SRS resource, one of the time and frequency reference signals can be configured. For example, it may be configured as part of the PUCCH or SRS spatial relation as shown below (the additions are indicated in bold). PUCCH-SpatialRelationInfo Information Element

```
-- TAG-PUCCH-SPATIALRELATIONINFO-START
PUCCH-SpatialRelationInfo ::=      SEQUENCE {
    pucch-SpatialRelationInfoId        PUCCH-SpatialRelationInfoId,
    servingCellId                      ServCellIndex
OPTIONAL, -- Need S
    referenceSignal                    CHOICE {
        ssb-Index                          SSB-Index,
        csi-RS-Index                       NZP-CSI-RS-ResourceId,
        srs                                PUCCH-SRS
    },
    pucch-PathlossReferenceRS-Id       PUCCH-PathlossReferenceRS-Id,
    p0-PUCCH-Id                        P0-PUCCH-Id,
    closedLoopIndex                    ENUMERATED { i0, i1 }
    pucch-TimeReferenceRS-Id           TimeReferenceRS-Id
    pucch-FrequencyReferenceRS-Id      FrequencyReferenceRS-Id
}
-- TAG-PUCCH-SPATIALRELATIONINFO-STOP
-- ASN1STOP
```

SRS-SpatialRelationInfo Information Element

```
SRS-SpatialRelationInfo ::=        SEQUENCE {
    servingCellId                      ServCellIndex
OPTIONAL, -- Need S
    referenceSignal                    CHOICE {
        ssb-Index                          SSB-Index,
        csi-RS-Index                       NZP-CSI-RS-ResourceId,
        srs                                SEQUENCE {
        resourceId                             SRS-ResourceId,
        uplinkBWP                              BWP-Id
    }
    srs-TimeReferenceRS-Id             TimeReferenceRS-Id
    srs-FrequencyReferenceRS-Id        FrequencyReferenceRS-Id
}
```

In one or more embodiments, for PUSCH, the time or frequency relation may be dynamically signaled or linked by network node 16 to a SRS resource or a SRS resource set, and timing or frequency derived from the DL RS associated with the SRS resource or resource set is used for PUSCH transmission.

A default time/frequency relation may be defined such that if time/frequency relation is not explicitly configured, a default DL RS is used as the time/frequency reference for UL transmission.

In one or more embodiments, the DL RS can be a DM-RS of a PDCCH or a PDSCH. DL RSs for timing/frequency reference can be implicitly configured or defined, i.e., the DMRS of a received PDCCH in a CORESET scheduling a UL transmission may be used as time and/or frequency reference for adjusting the scheduled UL transmission.

A wireless device 22, may report to network node 16, explicitly or implicitly, the number of different DL RS for timing/frequency tracking that the wireless device can follow via higher layer configuration.

Therefore, one or more embodiments may relate to one or more of the following:

When wireless device 22 is configured by network node 16 with multiple TRPs for DL reception and UL transmission and multiple DL RS for time and frequency tracking, a time and/or frequency relation is configured/indicated for each UL transmission for deriving the UL timing and frequency.

A time or frequency relation defines a DL RS as the time or frequency reference for a UL transmission.

The time or frequency relation can be semi-statically configured by network node 16 for each PUCCH/SRS resource or each set of PUCCH/SRS resources and activated or deactivated dynamically via a MAC CE command.

The time or frequency relation can be dynamically indicated by network node 16 for a PUSCH transmission via a linked SRS resource.

A default time/frequency relation may be defined such that if a time/frequency relation is not explicitly configured, one of the DL RS is used as the time/frequency reference for a UL transmission.

SOME EXAMPLES

Example A1. A network node 16 configured to communicate with a wireless device 22 at least in part using a plurality of transmission and reception points, TRPs, the network node 16 configured to, and/or comprising a radio interface 62 and/or comprising processing circuitry 68 configured to:

indicate one of a plurality of downlink reference signals, DL RSs, to use for deriving time or frequency for uplink, UL, transmission, the plurality of DL RSs being associated the plurality of TRPs; and optionally receive an uplink transmission that is based on the indication.

Example A2. The network node 16 of Example A1, wherein the processing circuitry 68 is further configured to pre-compensate a doppler shift between at least two of the plurality of TRPs.

Example A3. The network node 16 of any one of Examples A1-A2, wherein the plurality of TRPs are not one of frequency synchronized and time aligned with each other.

Example A4. The network node 16 of any one of Examples A1-A3, wherein the processing circuitry 68 is further configured one of semi-statically and dynamically configure the indication.

Example A5. The network node 16 of Example A4, wherein the indication is signaled using a Medium Access Control, MAC, Control Element, CE.

Example A6. The network node 16 of any one of Examples A1-A5, wherein the plurality of DL RSs include at least one of tracking reference signal, TRS, synchronization signal block, SSB, and channel state information reference signal, CSI-RS; and

the uplink signal includes at least one of physical uplink shared channel, PUSCH, physical uplink control channel, PUCCH, and sounding reference signal, SRS.

Example B1. A method implemented by a network node 16 configured to communicate with a wireless device 22 at least in part using a plurality of transmission and reception points, TRPs, the method comprising:

indicating one of a plurality of downlink reference signals, DL RSs, to use for deriving time or frequency for uplink, UL, transmission, the plurality of DL RSs being associated the plurality of TRPs; and optionally receiving an uplink transmission that is based on the indication.

Example B2. The method of Example B1, further comprising pre-compensating a doppler shift between at least two of the plurality of TRPs.

Example B3. The method of Example B1, wherein the plurality of TRPs are not one of frequency synchronized and time aligned with each other.

Example B4. The method of any one of Examples B1-B3, further comprising one of semi-statically and dynamically configuring the indication.

Example B5. The method of any one of Examples B1-B4, wherein the indication is signaled using a Medium Access Control, MAC, Control Element, CE.

Example B6. The method of any one of Examples B1-B5, wherein the plurality of DL RSs include at least one of tracking reference signal, TRS, synchronization signal block, SSB, and channel state information reference signal, CSI-RS; and the uplink signal includes at least one of physical uplink shared channel, PUSCH, physical uplink control channel, PUCCH, and sounding reference signal, SRS.

Example C1. A wireless device 22 configured to communicate with a network node 16 at least in part via a plurality of transmission and reception points, TRPs, the wireless device 22 configured to, and/or comprising a radio interface 82 and/or processing circuitry 84 configured to:

receive an indication of one of a plurality of downlink reference signals, DL RSs, to use for deriving time or frequency for uplink, UL, transmission, the plurality of DL RSs being associated the plurality of TRPs; and optionally cause an uplink transmission that is based on the indication.

Example C2. The wireless device 22 of Example C1, wherein the plurality of TRPs are not one of frequency synchronized and time aligned with each other.

Example C3. The wireless device 22 of any one of Examples C1-C2, wherein the indication is one of a semi-statically and dynamically configured indication.

Example C4. The wireless device 22 of Example C3, wherein the indication is signaled using a Medium Access Control, MAC, Control Element, CE.

Example C5. The wireless device 22 of any one of Examples C1-C4, wherein the plurality of DL RSs include at least one of tracking reference signal, TRS, synchronization signal block, SSB, and channel state information reference signal, CSI-RS; and the uplink signal includes at least one of physical uplink shared channel, PUSCH, physical uplink control channel, PUCCH, and sounding reference signal, SRS.

Example D1. A method implemented by a wireless device 22, the wireless device 22 configured to communicate with a network node 16 at least in part via a plurality of transmission and reception points, TRPs, the method comprising:

receiving an indication of one of a plurality of downlink reference signals, DL RSs, to use for deriving time or frequency for uplink, UL, transmission, the plurality of DL RSs being associated the plurality of TRPs; and optionally causing an uplink transmission that is based on the indication.

Example D2. The method of Example D1, wherein the plurality of TRPs are not one of frequency synchronized and time aligned with each other.

Example D3. The method of any one of Examples D1-D2, wherein the indication is one of a semi-statically and dynamically configured indication.

Example D4. The method of Example D3, wherein the indication is signaled using a Medium Access Control, MAC, Control Element, CE.

Example D5. The method of any one of Examples D1-D4, wherein the plurality of DL RSs include at least one of tracking reference signal, TRS, synchronization signal block, SSB, and channel state information reference signal, CSI-RS; and the uplink signal includes at least one of physical uplink shared channel, PUSCH, physical uplink control channel, PUCCH, and sounding reference signal, SRS.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to communicate with a wireless device using at least one of a plurality of transmission and reception points, TRPs, the network node including processing circuitry configured to cause the network node to:

indicate to the wireless device a first downlink reference signal, DL RS, of a plurality of downlink reference signals, DL RSs, to use for deriving an uplink, UL, transmission parameter for an UL transmission, each of the plurality of DL RSs being associated with a respective one of the plurality of TRPs, the indication defining a timing relation between the first DL RS and the UL transmission, the indication being dynamically configured and being signalled using a Downlink Control Information, DCI, format; and receive the UL transmission, the UL transmission being based on the derived UL transmission parameter.

2. The network node of claim 1, wherein the UL transmission parameter is one of a frequency parameter and a timing parameter.

3. The network node of claim 1, wherein the indication is one of explicit and implicit.

4. The network node of claim 1, wherein:

the plurality of DL RSs include at least one of:
a tracking reference signal, TRS;
a synchronization signal block, SSB; and
a channel state information reference signal, CSI-RS; and the UL transmission includes at least one of:
a physical uplink shared channel, PUSCH;
a physical uplink control channel, PUCCH; and
a sounding reference signal, SRS.

5. A wireless device configured to communicate with a network node via at least one of a plurality of transmission and reception points, TRPs, the wireless device including processing circuitry configured to cause the wireless device to:

receive an indication of a first downlink reference signal, DL RS, of a plurality of DL RSs, each of the plurality of DL RSs being associated with a respective one of the plurality of TRPs, the indication defining a timing relation between the first DL RS and the UL transmission, the indication being dynamically configured and being signalled using a Downlink Control Information, DCI, format;

derive a parameter for an uplink, UL, transmission based on the first DL RS; and cause the UL transmission based on the derived UL transmission parameter.

6. The wireless device of claim 5, wherein the UL transmission parameter is one of a frequency parameter and a timing parameter.

7. The wireless device of claim 5, wherein the indication is one of explicit and implicit.

8. The wireless device of claim 5, wherein:

the plurality of DL RSs include at least one of:
a tracking reference signal, TRS;
a synchronization signal block, SSB; and
a channel state information reference signal, CSI-RS; and the UL transmission includes at least one of:
a physical uplink shared channel, PUSCH;
a physical uplink control channel, PUCCH; and
a sounding reference signal, SRS.

9. A method implemented in a network node, the network node being configured to communicate with a wireless device using at least one of a plurality of transmission and reception points, TRPs, the method comprising:

indicating to the wireless device a first downlink reference signal, DL RS, of a plurality of downlink reference signals, DL RSs, to use for deriving an uplink, UL, transmission parameter for an UL transmission, each of the plurality of DL RSs being associated with a respective one of the plurality of TRPs, the indication defining a timing relation between the first DL RS and the UL transmission, the indication being dynamically configured and being signalled using a Downlink Control Information, DCI, format; and receiving the UL transmission, the UL transmission being based on the derived UL transmission parameter.

10. The method of claim 9, wherein the UL transmission parameter is one of a frequency parameter and a timing parameter.

11. The method of claim 9, wherein:

the plurality of DL RSs include at least one of:

a tracking reference signal, TRS;

a synchronization signal block, SSB; and a channel state information reference signal, CSI-RS; and the UL transmission includes at least one of:

a physical uplink shared channel, PUSCH;

a physical uplink control channel, PUCCH; and a sounding reference signal, SRS.

12. A method implemented by a wireless device, the wireless device being configured to communicate with a network node via at least one of a plurality of transmission and reception points, TRPs, the method comprising:

receiving an indication of a first downlink reference signal, DL RS, of a plurality of DL RSs, each of the plurality of DL RSs being associated with a respective one of the plurality of TRPs, the indication defining a timing relation between the first DL RS and the UL transmission, the indication being dynamically configured and being signalled using a Downlink Control Information, DCI, format;

deriving a parameter for an uplink, UL, transmission based on the first DL RS; and causing the UL transmission based on the derived UL transmission parameter.

13. The method of claim 12, wherein the UL transmission parameter is one of a frequency parameter and a timing parameter.

* * * * *